United States Patent [19]

Baltus et al.

[11] Patent Number: 5,751,249

[45] Date of Patent: May 12, 1998

[54] RADIO TRANSMISSION SYSTEM AND A RADIO APPARATUS FOR USE IN SUCH A SYSTEM

[75] Inventors: Petrus G. M. Baltus; Lukas Leyten; Jan Van Sinderen; Antoon M. H. Tombeur; Hendrik A. Visser; Antonius G. Wagemans, all of Eindhoven, Netherlands

[73] Assignee: U.S. Philips Corporation, New York, N.Y.

[21] Appl. No.: 527,738

[22] Filed: Sep. 13, 1995

[30] Foreign Application Priority Data

Sep. 14, 1994 [EP] European Pat. Off. ............. 94202648

[51] Int. Cl.⁶ ................................................ H01Q 3/24
[52] U.S. Cl. ..................... 342/372; 342/152; 455/52.3
[58] Field of Search ............................. 342/152, 372, 342/453; 455/52.3, 65

[56] References Cited

U.S. PATENT DOCUMENTS

| | | | |
|---|---|---|---|
| 3,740,750 | 6/1973 | Moulton | 343/115 |
| 4,346,382 | 8/1982 | Bosc et al. | 343/55 A |
| 4,568,940 | 2/1986 | Diamond | 343/16 M |
| 4,675,880 | 6/1987 | Davarian | 375/39 |
| 4,789,861 | 12/1988 | Baggett et al. | 342/152 |
| 5,278,564 | 1/1994 | Groenenboom | 342/123 |

FOREIGN PATENT DOCUMENTS 0459038  4/1991  European Pat. Off. .

OTHER PUBLICATIONS

"Analysis and Design of Analog Integrated Circuits", Section Edition, by Paul R. Gray et al, Wiley & Sons 1984, pp. 593–600.

Primary Examiner—Thomas H. Tarcza
Assistant Examiner—Dao L. Phan
Attorney, Agent, or Firm—Arthur G. Schaier

[57] ABSTRACT

A radio transmission system comprises a phased-array radio apparatus for optimizing reception in a multipath transmission environment. In the phased-array radio apparatus, phase shifting is performed after down-conversion of received RF signals. Phase control and beam-forming are simple. By applying a zero-IF or low-IF receiver structure, the complete structure can easily be fully integrated.

9 Claims, 4 Drawing Sheets

RADIO TRANSMISSION SYSTEM AND A RADIO APPARATUS FOR USE IN SUCH A SYSTEM

BACKGROUND OF THE INVENTION

1. Field of the Invention

The present invention relates to a radio transmission system comprising at least one radio apparatus which comprises a phased-array receiving arrangement with at least two receiver front-ends which are coupled to at least two antennas. Such phased-array receiving arrangements are applied in systems which suffer from multipath propagation where it is desired to trace a signal path having the best reception quality. The phased-array antenna allows for beam-forming. Examples of such radio systems are mobile radio systems, cordless telephony systems, in-house audio link systems, or the like, where the received signals usually are apt to fading.

The present invention further relates to a radio apparatus for use in such a system.

2. Discussion of the Related Art

A radio transmission system of this kind is known from the European Patent Application EP 0 459 038, in which off-line processing is applied to process signals from a phased-array of antennas for optimising the reception of a desired signal in the presence of interfering signals. In the known system coefficients of tapped delay lines as phase shifting networks are computed and updated so as to find an optimum for a received signal quality. The phase shifting networks operate on RF-signals (Radio Frequency). The method as applied in the known system is a complicated brute-force method which is not suitable in environments where reception conditions vary quickly. Such a brute force method is difficult to implement in e.g. a low power portable radio apparatus because a lot of processing capacity is required, then, requiring considerable battery power. Furthermore, it is difficult to implement phase shifting networks operating on RF-signals, especially when applied in a low power portable radio apparatus.

SUMMARY OF THE INVENTION

It is an object of the present invention to provide a phased-array radio apparatus in a radio transmission system of which the antenna beam can be adjusted quickly and which is easy to implement.

To this end the radio transmission system according to the present invention is characterized in that a first receiver front-end is a quadrature receiver having two mixers for forming quadrature signals from a received signal, and in that the first receiver front-end comprises a first phase shifting arrangement which is coupled to outputs of the mixers, an output of the phase shifting arrangement being coupled to an intermediate frequency stage of a second receiver front-end.

In an embodiment of a radio transmission system according to the present invention, the phase shifting arrangement comprises two adjustable amplifiers of which inputs are coupled to the outputs of the mixers, and a combining arrangement for combining outputs of the amplifiers. Herewith a very simple phase shifting arrangement is achieved, which can simply be adjusted by adjusting amplification factors.

Further embodiments are claimed in the dependent claims, such as a zero-IF or low-IF receiver, so that still less demands are to be imposed on the phase shifting arrangement, and Gilbert cell amplifiers in the phase shifting arrangements, which are easy to adjust. Herewith, the complete zero-IF phased-array receiver can easily be integrated within an integrated circuit. The phase shifting arrangements can also be passive weighting circuits or digitally controlled combined switching and interpolation circuits based upon differential pairs switching currents which are proportional to the quadrature signals.

BRIEF DESCRIPTION OF THE DRAWINGS

The present invention will now be described, by way of example, with reference to the accompanying drawings, wherein FIG. 1 schematically shows a radio transmission system according to the present invention.

Throughout the figures the same reference numerals are used for the same features.

DETAILED DESCRIPTION OF THE PREFERRED EMBODIMENTS

Figure 1:
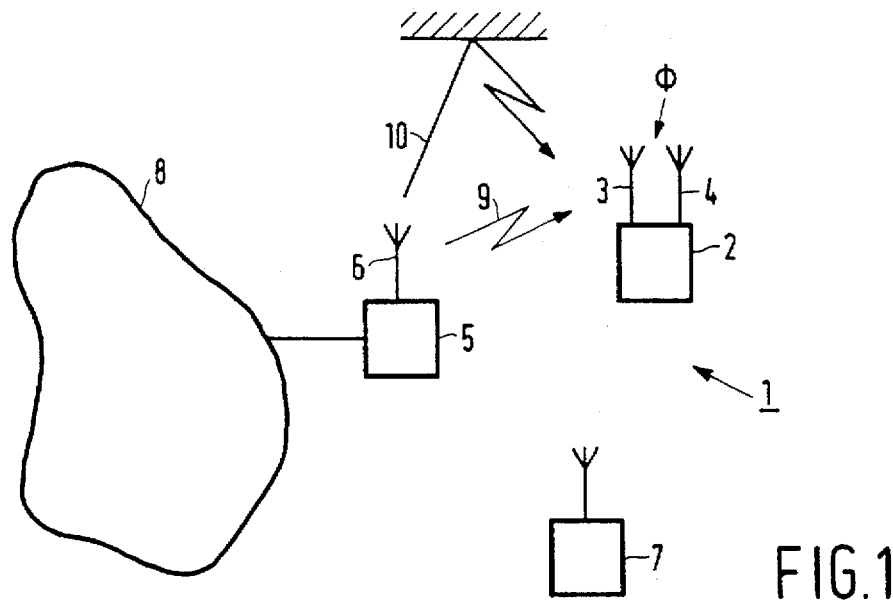

FIG. 1 schematically shows a radio transmission system 1 according to the present invention comprising a radio apparatus 2 having antennas 3 and 4. The radio apparatus 2 can be a car radio apparatus, a paging apparatus, or a GPS device, or the like, the system 1 then being a broadcast system, or the radio apparatus 2 can be a mobile phone or a cordless phone, or the like, the system 1 then being a bi-directional communication system. The system 1 can be any other radio transmission system. In case of a uni-directional or a bidirectional system, respectively, the radio apparatus receives radio signals from, or communicates with a radio apparatus 5, respectively, which broadcast or communicates with an antenna 6, respectively. Further shown is a radio apparatus 7, which could cause interference. In case of a bi-directional system, e.g. a cordless telephone system, the radio apparatus 5 is a radio base station connected to a public switched telephone network 8, and the radio apparatus 2 is a handset. The antennas 3 and 4 of the radio apparatus 2 receive radio waves 9 and 10 via different paths, i.e. the system represents a multipath transmission environment. In case of car radio, cellular radio, or cordless telephony, such an environment is a quickly changing environment as to received waves.

Figure 2:
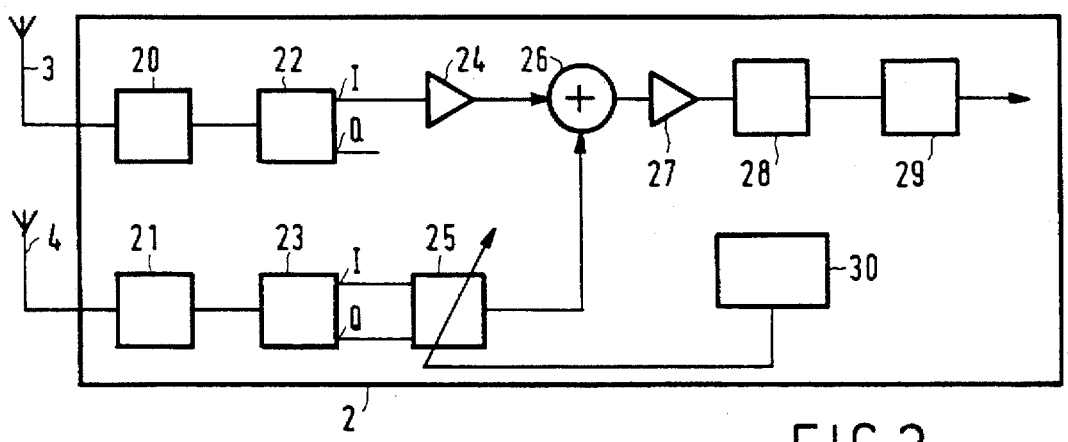
FIG. 2 shows a first embodiment of a radio apparatus according to the present invention.

FIG. 2 shows a first embodiment of the phased-array radio apparatus 2 according to the present invention, which is a digital radio apparatus receiving GMSK (Gaussian Minimum Shift Keying) modulated signals for instance. The radio apparatus 2, which is a superheterodyne receiver, comprises two branches, with bandpass filters 20 and 21 connected to the antennas 3 and 4 respectively, followed by receiver front-ends 22 and 23, respectively. The receiver front-ends 22 and 23 can be integrated circuits of type UAA2078. In the upper branch the so-called I-output of this IC (Integrated Circuit) is coupled to an amplifier 24, and in the lower branch, being a quadrature branch, the I-output and the Q-output are coupled to an adjustable phase shifting arrangement 25. At output side, the amplifier 24 and the phase shifting arrangement 25 are coupled to a summing arrangement 26 which is coupled to a series arrangement of an amplifier 27, a PLL (Phase Lock Loop) FM (Frequency Modulation) demodulator 28 and an amplifier 29. The phase of phase shifting arrangement 25 can be adjusted by means of DC (Direct Current) voltages, supplied by a controller 30. The controller 30 can be a programmed microcontroller having RAM (Random Access Memory), ROM (Read Only Memory), digital-to-analog converters, analog-to-digital converters and digital I/O (Input/Output) interfaces. Such a microcontroller is well-known in the art and is not shown in detail here. The DC-adjustment voltage can then be supplied via a digital-to-analog converter (not shown). The controller can also be a so-called dedicated hardware circuit, such as disclosed in the European Patent Application No. 94202649.3 as filed by the same applicant at the same date, herewith incorporated by reference. In this European Application, the dedicated hardware circuit is a control circuit for controlling two receiver front-ends in an antenna diversity phased-array radio apparatus.

Figure 3:
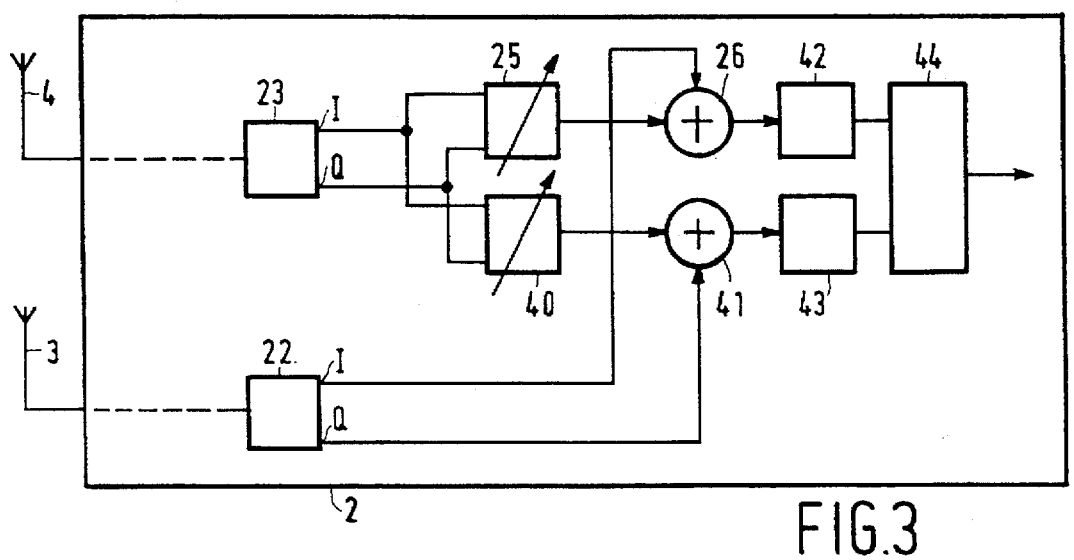
FIG. 3 shows a second embodiment of a radio apparatus according to the present invention.

FIG. 3 shows a second embodiment of the radio apparatus 2 according to the present invention, with two quadrature receiver front-ends, in addition to the first phase shifting arrangement 25, a second phase shifting arrangement 40 being coupled to the receiver front-end 23. The phase shifting arrangement is coupled to a summing arrangement 41. At output side, the summing arrangements 26 and 41 are coupled to channel selectivity filters 42 and 43 which are coupled to a quadrature frequency-to-voltage converter 44 so as to obtain a demodulated signal. This radio apparatus 2 can be a so-called zero-IF (Intermediate Frequency) or low-IF receiver, which can be implemented as a single Integrated Circuit.

Figure 4:
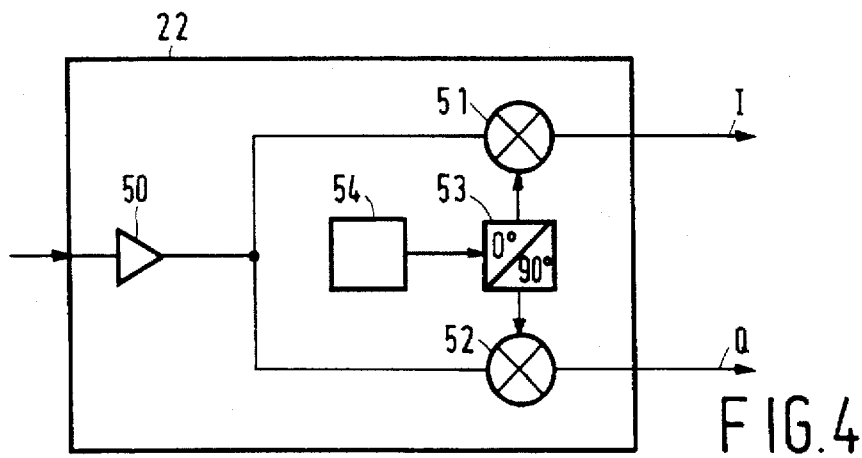
FIG. 4 shows a front-end in a radio apparatus according to the present invention.

FIG. 4 shows the front-end 22 in the radio apparatus 2 according to the present invention, comprising an amplifier 50 which is coupled to mixers 51 and 52 so as to obtain the quadrature signals I and Q. The mixers 51 and 52 are further coupled to a 0°/90°-phase shifter 53, which is coupled to a local oscillator 54. When a 90° phase shifting arrangement is put into the I-signal branch, the phase shifter 53 can be dispensed with.

Figure 5A:
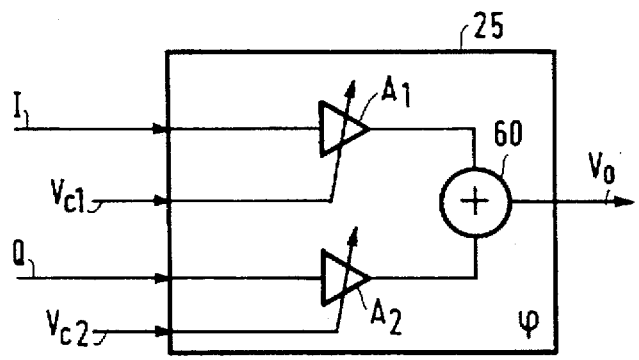
FIGS. 5A and 5B show a first embodiment of a phase shifting arrangement according to the present invention.
Figure 5B:
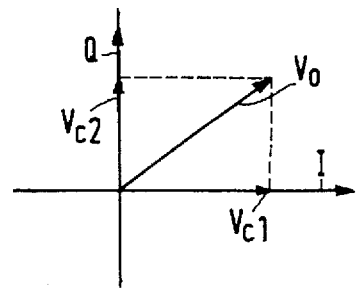

FIG. 5A shows the phase shifting arrangement 25 according to the present invention, comprising adjustable amplifiers $A_1$ and $A_2$, which are coupled to a summing arrangement 60. To the phase shifting arrangement 25 input voltages I and Q, an output voltage $V_o$, and DC-control voltages $V_{c1}$ and $V_{c2}$, are supplied, as is shown in FIG. 5B. By varying the control voltages $V_{c1}$ and $V_{c2}$, a full $2\pi$ range of a space angle $\phi$ of a main antenna beam formed by the antennas 3 and 4 can be adjusted. For a given two antenna configuration, a relationship between an electrical phase shift $\phi$ and the space angle $\phi$ can be stored in a lookup-table being stored in the ROM of the microcontroller 30. This relationship can easily be found mathematically. In a given antenna configuration such a relationship was found as in the table below, the configuration being formed by two monopole $\lambda/4$ antennas spaced apart $\lambda/2$, $\lambda$ being an antenna wave-length.

| space angle $\phi$ | electrical phase shift $\phi$ | $V_{c1}$ | $V_{c2}$ |
| --- | --- | --- | --- |
| 0 | $-\pi$ | $-1$ | 0 |
| $\pi/8$ | $-2.902$ | $-0.972$ | 0.237 |
| $\pi/4$ | $-2.221$ | $-0.606$ | 0.796 |
| $3\pi/8$ | $-1.202$ | 0.360 | 0.933 |
| $\pi/2$ | 0 | 1 | 0 |
| $5\pi/8$ | 1.202 | 0.360 | $-0.933$ |
| $3\pi/4$ | 2.221 | $-0.606$ | $-0.796$ |
| $7\pi/8$ | 2.902 | $-0.972$ | $-0.237$ |

For a given desired space angle $\phi$, the lookup-table can be addressed, and the amplifiers $A_1$ and $A_2$ can be adjusted accordingly by reading out the lookup table and supplying the DC-voltage $V_{c1}$ and $V_{c2}$ via digital-to-analog converters (not shown).

Figure 6:
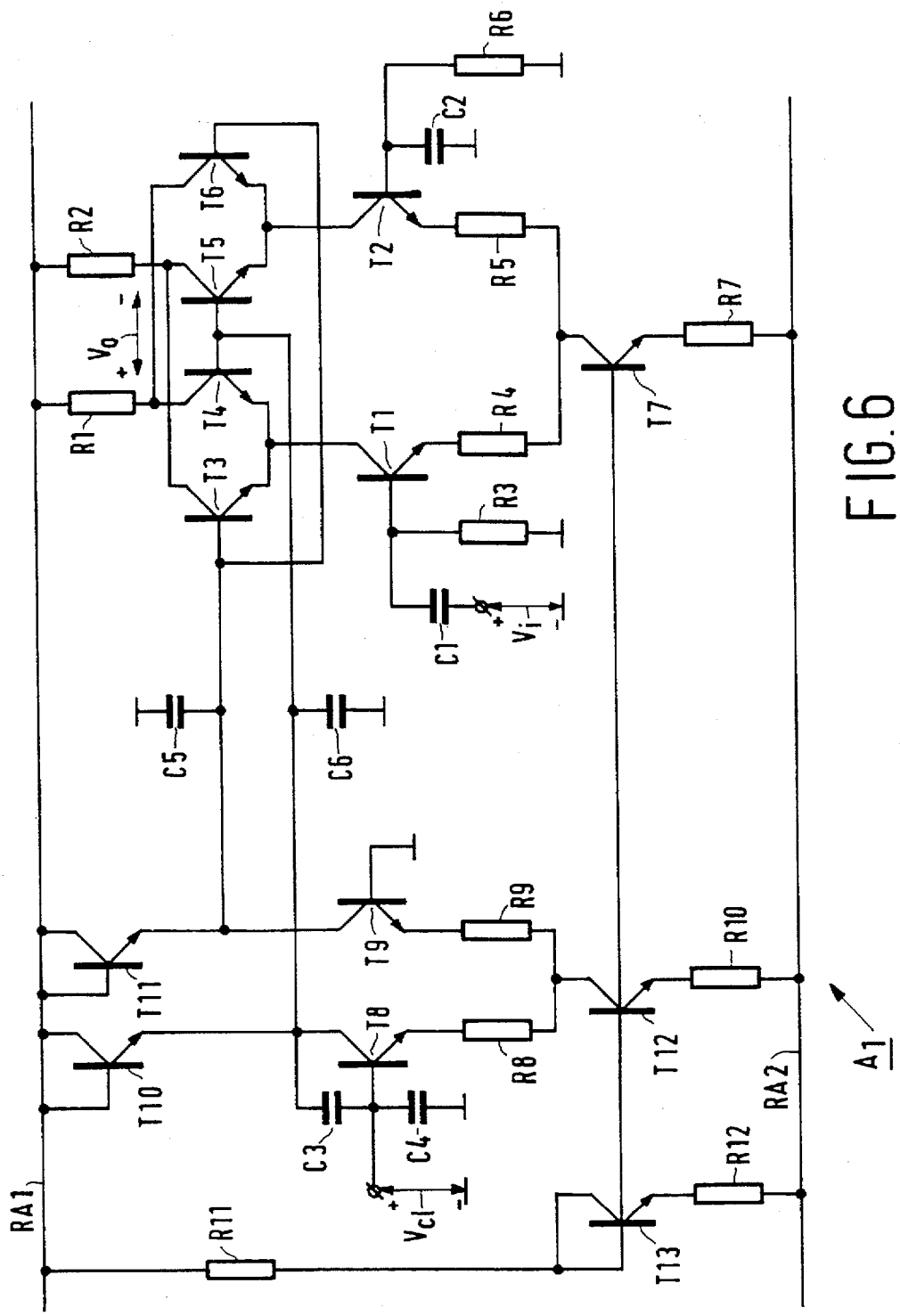
FIG. 6 shows an adjustable amplifier in a phase shifting arrangement according to the present invention.

FIG. 6 shows then adjustable amplifier $A_1$ in the phase shifting arrangement 25 according to the present invention. The amplifier $A_1$ is a so-called Gilbert cell, comprising an input/multiplier differential stage formed by transistors T1, T2, T3, T4, T5, T6 and T7, in which also resistors R1, R2, R3, R4, R5, R6, and R7 are shown, and capacitors C1 and C2. The Gilbert cell further shows a differential control stage formed by the transistors T8, T9, T10, T11, and T12, the resistors R8, R9, and R10, and the capacitors C3 and C4. The control stage is coupled to the multiplier part of the input stage. Further shown are a transistor T13, resistors R11 and R12, and capacitors C5 and C6. The Gilbert cell is provided with supply rails RA1 and RA2. For a detailed discussion as to the operation of a Gilbert cell referred is to the handbook "*Analysis and Design of Analog Integrated Circuits*", P. R. Gray et al, Wiley & Sons, 1984, pp. 593–600. For fully implementing the phase shifting arrangement 25, a complete amplifier circuit as described above, but slightly modified, is added with its output connected to the output of the described amplifier circuit. The second amplifier (not show in detail) differs from the shown amplifier in that it does not comprise resistors R1, R2 and R6, and also not the capacitor C2. Furthermore, a transistor in the second amplifier circuit corresponding to the transistor T2 in the first amplifier circuit is connected with its base to the base of the transistor T2. Herewith, the summing fuction 60 is formed without extra circuitry being necessary.

Figure 7:
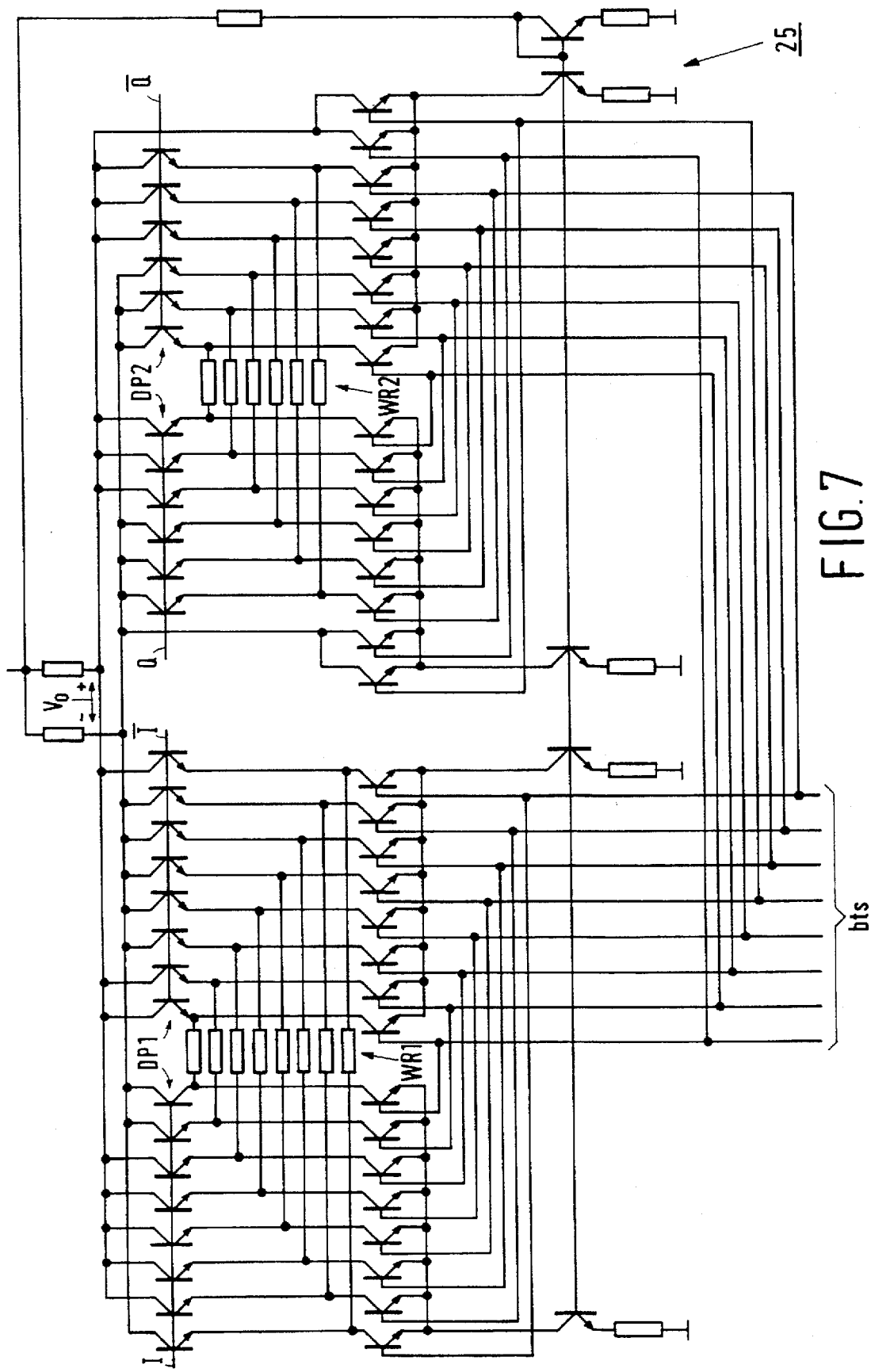
FIG. 7 shows a second embodiment of a phase shifting arrangement according to the present invention.

FIG. 7 shows a second embodiment of the phase shifting arrangement 25 according to the present invention, the quadrature signals I and Q and inverse quadrature signals being input signals. Phase shifting is achieved by applying selection bits bts to a passive weighting or interpolation structure formed by differential pairs DP1 and DP2, and weighting resistors WR1 and WR2. The selection bits bts switch weighted currents causing voltage differences at the output $V_o$. The values of the weighting resistors WR1 and WR2 are chosen appropriately so as to implement conversion from an electrical phase shift to a space angle, as discussed in relation to FIGS. 5A and 5B.

Figure 8:
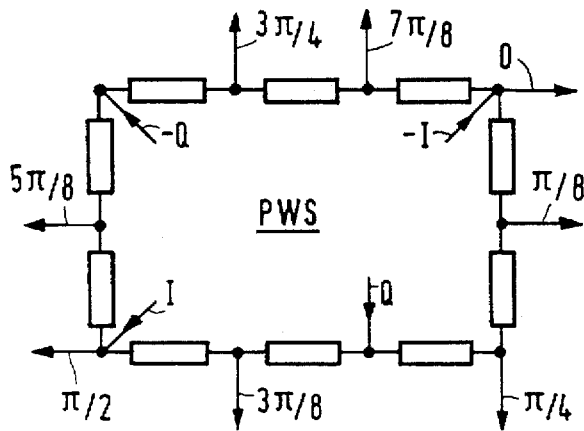
FIG. 8 shows a third embodiment of a phase shifting arrangement according to the present invention.

FIG. 8 shows a third embodiment of the phase shifting arrangement 25 according to the present invention, being a passive weighting structure PWS of resistors to which the signals I, −I, Q and −Q are fed. Voltages at the taps shown correspond with space angles 0, $\pi/8$, ... , $7\pi/8$ as indicated in the table discussed with respect to FIGS. 5A and 5B.

We claim:

1. A radio transmission system comprising at least one radio apparatus which comprises a phased-array receiving arrangement with at least two receiver front-ends coupled to at least two antennas wherein a first receiver front-end is a quadrature receiver having two mixers for forming quadrature signals (I, Q) from a received signal, the two mixers each having an output, and wherein the first receiver front-end further comprises a first phase shifting arrangement coupled to the outputs of the mixers, the first phase shifting arrangement further having an output coupled to an intermediate frequency stage of a second receiver front-end.

2. The radio transmission system according to claim 1, wherein the second receiver front-end is a quadrature receiver, and wherein the first receiver front-end further comprises a second phase shifting arrangement coupled to the outputs of the mixers.

3. The radio transmission system according to claim 1, wherein an intermediate frequency of the intermediate frequency stage is zero.

4. The radio transmission system according to claim 2, wherein the first and second phase shifting arrangements are adjustable.

5. The radio transmission system according to claim 4, wherein the first and second phase shifting arrangements each comprise two adjustable amplifiers, the adjustable amplifiers having inputs coupled to the outputs of the mixers, and wherein each phase shifting arrangement further comprises a combining arrangement for combining outputs of the amplifiers.

6. The radio transmission system according to claim 5, wherein the amplifiers are Gilbert cells.

7. The radio transmission system according to claim 2, wherein the first and second phase shifting arrangements are passive weighting circuits based upon a voltage division of the quadrature signals (I, Q).

8. The radio transmission system according to claim 2, wherein the first and second phase shifting arrangements are combined switching and interpolation circuits based upon a differential pairs weighting and switching currents which are proportional to the quadrature signals (I, Q).

9. A radio apparatus for use in a radio transmission system, the radio apparatus comprising:

a phased-array receiving arrangement, the phased-array receiving arrangement having at least two receiver front-ends coupled to at least two antennas wherein a first receiver front-end is a quadrature receiver having two mixers for forming quadrature signals from a received signal, the two mixers each having an output, and wherein the first receiver front-end further comprises a first phase shifting arrangement coupled to the outputs of the mixers, the phase shifting arrangement further having an output coupled to an intermediate frequency stage of a second receiver front-end.

* * * * *